(No Model.)
H. LEMP.
LAMINATED DIE, HAMMER, &c., FOR ELECTRIC METAL WORKING APPARATUS.
No. 462,262. Patented Nov. 3, 1891.
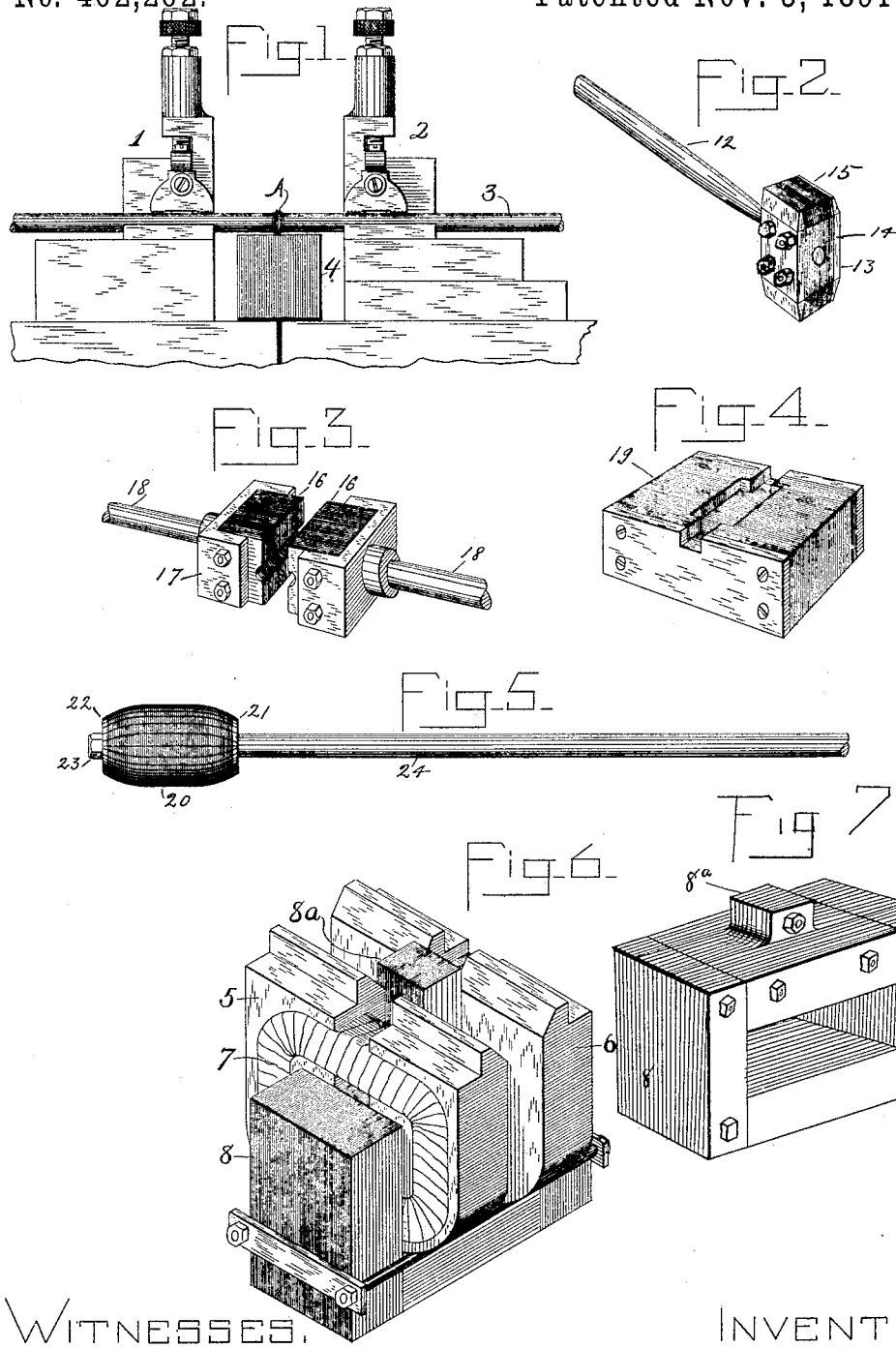

UNITED STATES PATENT OFFICE.

HERMANN LEMP, OF LYNN, MASSACHUSETTS, ASSIGNOR TO THE THOMSON ELECTRIC WELDING COMPANY, OF MAINE.

LAMINATED DIE, HAMMER, &c., FOR ELECTRIC METAL-WORKING APPARATUS.

SPECIFICATION forming part of Letters Patent No. 462,262, dated November 3, 1891.

Application filed February 24, 1891. Serial No. 382,320. (No model.)

*To all whom it may concern:*

Be it known that I, HERMANN LEMP, a citizen of the United States, and a resident of Lynn, in the county of Essex and State of Massachusetts, have invented certain new and useful Laminated Dies, Hammers, &c., of which the following is a specification.

This invention relates to the construction of devices such as dies, hammers, anvils, mandrels, or other devices or parts which are used in apparatus such as electric metal-working apparatus, and which require to be for a greater or less length of time in contact with the work while the electric current is passing through it.

The invention consists, essentially, in making such devices or parts of sheets or plates of metal laminated and insulated more or less from one another in a plane transverse to the direction of the flow of current through the work with which they make contact. The application of solid dies, mandrels, &c., to a bar or other piece of metal through which current is flowing to heat it is undesirable, for the reason that where such die or mandrel touches the bar the current takes two paths, part of it passing through the die, instead of all through the bar, as it should. In other words, the forging, shaping, or other apparatus takes a part of the current from the bar or short-circuits the part which it touches and thereby reduces the heating effect at the objective point, besides becoming unduly heated itself.

This invention consists in laminating any apparatus or tools that would have this tendency in a direction transverse to the flow of current. The insulation may be air, metallic oxide on the surface of the metal plate, mica, or other suitable insulation.

In the accompanying drawings, Figure 1 illustrates the invention as applied to an anvil employed in connection with an electric-welding machine. Fig. 2 shows the invention applied to a hammer for use in electric metal-working. Fig. 3 illustrates in perspective two dies for compressing or forging. Fig. 4 illustrates a mold for a similar purpose. Fig. 5 shows a laminated mandrel for use in welding pipe. Fig. 6 illustrates in perspective a special construction of the anvil from the core of an electric-welding or metal-working transformer. Fig. 7 is a perspective view of the core of the transformer.

In Fig. 1 the clamps and terminals of an electric-welding or metal-working machine are indicated at 1 2. The bar or other piece of metal which has been heated and welded is indicated at 3, while A shows the burr formed in the operation. The laminated anvil indicated at 4 is placed beneath the work, so that the burr may be hammered upon it by means of a hammer, such as indicated, for instance, in Fig. 2. It will be readily seen that if the anvil and hammer were solid the current would be shunted around the weld when the burr had been sufficiently reduced to allow the tools to come into contact with the bar at parts thereof to one side of the bevel; but by laminating the parts that come into contact with the bar or work, as shown, this shunting of the current will be prevented. The manner of building up the tool is immaterial. The plates may be bolted together, clamped between plates, or set in a recess made in a solid block. As will be observed, the laminations in the hammer are such that when it is used upon the burr the laminations will be transverse to the direction of the flow of the heating-current.

In Fig. 2, 12 is a mandrel, and 13 the head of the hammer built up from laminæ 14, secured in any proper manner between end plates. The face 15 of the hammer may obviously be used to strike the work in a line such that the laminations of the head will be parallel to those of the anvil 4, and the head will therefore not shunt the current from the work.

In Fig. 3 are shown two laminated dies 16 that may be used to compress the burr formed on a round rod or to give a round section to a rectangular rod. They may be of any pattern for all manners of forging and shaping, the laminations being always arranged so that when the tool comes into contact with the work the current will be prevented from shunting itself from the work by passing through the body of the tool. The dies 16 may be constructed, as shown, of laminæ bolted in place in heads 17, fixed or secured to the ends of operating-rods 18, by which the dies may be, one or both, moved in line to compress the work in the groove formed in the face of the die.

Fig. 4 illustrates a mold 19 in which a piece of metal heated by an electric current passing through it may be upset so as to take the form of the mold; or, the piece heated by the current might be hammered into the mold while the current is flowing through it. In this case, as before, the laminations are arranged so that the plane of the laminations will be transverse to the direction of the flow of the current in the metal that comes in contact with it. The mold is made up of laminæ, as indicated, fastened between the end plates, and the upper face of the mold is provided with a cavity, as indicated, formed at the edge of the laminæ.

Fig. 5 shows a pipe-mandrel 20 for use in the operation of electrically welding pipe. The mandrel is, as well understood, inserted into the pipe beneath the weld in order to prevent collapse or sinking of the hot metal when the pipe is subjected at the weld to pressure or blows from the exterior. In this figure the mandrel is shown made up of a number of disks secured between a flange 21 on the rod 24 and an end disk or plate 22 by means of a nut 23, applied to the end of the rod in obvious manner.

Fig. 6 illustrates a preferred way of constructing the anvil in an electric welding or metal-working machine. The heating electric current is derived from the secondary of an alternating-current transformer and the anvil itself is made integral with or sustained directly upon the iron core. In this figure 5 and 6 are the usual copper castings forming the secondary and having grooves in which lie the primary wire 7, formed of a coil suitably taped and insulated. The iron core, laminated as usual, is indicated at 8. The clamps or work-holders slide or are supported on top of the secondary, as well understood in the art, and, being in contact with the ends of said secondaries, take up the current which passes through the work and heat it. The anvil indicated at 8ª is a projection from the core 8, and consists of plates integral with those composing the iron of the core. The advantage of this construction is solidity and rigidity to withstand the blows of the hammer.

In all the various forms of apparatus shown the laminations are of course insulated to a certain extent. Otherwise there would be no object in making the dies, &c., as shown; but ordinarily the oxide scale on the iron or steel would be sufficient insulation, although, if required, some special thin insulating material might be used.

The essence of the invention consists in making all tools, &c., that come in contact with the metal through which the heating-current is passing of such a construction that the current cannot deviate from its course with the effect of reducing the heat in the work, and thereby heating the tool.

What I claim as my invention is—

1. In an electric metal-working apparatus, metal dies, hammers, or other devices or parts which require to be in contact with the heated work for a greater or less time while the current is passing through it, having their working surfaces where they engage with the work laminated or subdivided in planes transverse to the direction of the flow of current, as and for the purpose described.

2. Electric metal-working devices, such as dies, hammers, mandrels, or other tools which make contact with the work while traversed by the current, constructed from laminæ or plates of metal laminated and insulated in a plane transverse to the flow of current in the parts with which they make contact.

3. The combination, with an electric metal-working apparatus, of an anvil, hammer, die, or similar device laminated in a direction transverse to the flow of current in the work, as and for the purpose described.

4. In an electric metal-working apparatus, an anvil sustained upon the iron core of the transformer and formed of laminæ of metal, as and for the purpose described.

5. In an electric metal-working apparatus, an anvil consisting of laminæ of metal projecting from and integral with laminæ composing the core of the transformer.

6. In an electric metal-working apparatus, the combination of the iron core 8, the two secondary bars 5 and 6, and the intermediate anvil 8ª, formed of laminæ of metal.

Signed at Lynn, in the county of Essex and State of Massachusetts, this 21st day of February, A. D. 1891.

HERMANN LEMP.

Witnesses:
JOHN W. GIBBONEY,
BENJAMIN B. HULL.